US011082236B2

United States Patent
Kopp

(10) Patent No.: US 11,082,236 B2
(45) Date of Patent: Aug. 3, 2021

(54) METHOD FOR PROVIDING SECURE DIGITAL SIGNATURES

(71) Applicant: LuxTrust S.A., Capellen (LU)

(72) Inventor: Thomas Kopp, Capellen (LU)

(73) Assignee: LuxTrust S.A., Luxembourg (LU)

( * ) Notice: Subject to any disclaimer, the term of this patent is extended or adjusted under 35 U.S.C. 154(b) by 386 days.

(21) Appl. No.: 16/317,215

(22) PCT Filed: Jul. 12, 2017

(86) PCT No.: PCT/EP2017/067553
§ 371 (c)(1),
(2) Date: Jan. 11, 2019

(87) PCT Pub. No.: WO2018/011267
PCT Pub. Date: Jan. 18, 2018

(65) Prior Publication Data
US 2019/0305963 A1 Oct. 3, 2019

(30) Foreign Application Priority Data

Jul. 13, 2016 (LU) .................................... LU93150

(51) Int. Cl.
*H04L 9/32* (2006.01)
*H04L 9/08* (2006.01)

(52) U.S. Cl.
CPC ............ *H04L 9/3247* (2013.01); *H04L 9/083* (2013.01); *H04L 9/0825* (2013.01);
(Continued)

(58) Field of Classification Search
CPC ..... H04L 9/3247; H04L 9/0825; H04L 9/083; H04L 9/0877; H04L 9/0897; H04L 9/3215; H04L 9/3231; H04L 9/3263
See application file for complete search history.

(56) References Cited

U.S. PATENT DOCUMENTS 7,487,357 B2 * 2/2009 Smith ................... G06F 21/335
713/176
8,245,292 B2 * 8/2012 Buer ....................... G06F 21/34
726/20
(Continued)

FOREIGN PATENT DOCUMENTS

EP      2819107 A1    12/2014
WO   2016019086 A1    2/2016

OTHER PUBLICATIONS

International Search Report dated Oct. 23, 2017 for Parent PCT Appl. No. PCT/EP2017/067553.
(Continued)

*Primary Examiner* — Shahriar Zarrineh
(74) *Attorney, Agent, or Firm* — James E. Walton

(57) ABSTRACT

The invention provides a method for providing a strong link between a Subject and a cryptographic public/private key pair. The proposed Subject device and key distribution algorithm is less prone to man-in-the middle attacks as comparable known algorithms, thereby inherently strengthening the trustworthiness of any digital signature made with a private key distributed to a user in accordance with the proposed method. The invention additionally enables distribution of authentication factors over unsecure channels and reducing the need of sensitive information transmission by at the same time augmenting security for finally associating a generated public/private key pair to a Subject and using it for signature creation purposes.

19 Claims, 3 Drawing Sheets

(52) U.S. Cl.
CPC .......... *H04L 9/0877* (2013.01); *H04L 9/0897* (2013.01); *H04L 9/3215* (2013.01); *H04L 9/3231* (2013.01); *H04L 9/3263* (2013.01)

(56) References Cited

U.S. PATENT DOCUMENTS

| | | | | |
|---|---|---|---|---|
| 8,843,752 | B1* | 9/2014 | Priyadarshi | H04L 9/3247 713/176 |
| 8,868,923 | B1* | 10/2014 | Hamlet | G06F 21/32 713/186 |
| 9,088,568 | B1* | 7/2015 | Talati | H04L 63/12 |
| 2002/0138735 | A1* | 9/2002 | Felt | H04L 9/3247 713/176 |
| 2002/0157003 | A1* | 10/2002 | Beletski | H04L 9/3231 713/170 |
| 2003/0204726 | A1* | 10/2003 | Kefford | H04L 63/0428 713/171 |
| 2003/0210789 | A1* | 11/2003 | Farnham | H04L 9/0844 380/270 |
| 2005/0010758 | A1* | 1/2005 | Landrock | H04L 63/126 713/156 |
| 2006/0143252 | A1* | 6/2006 | Perterson | G06F 16/00 |
| 2007/0118745 | A1* | 5/2007 | Buer | G06F 21/34 713/168 |
| 2007/0258594 | A1* | 11/2007 | Sandhu | H04L 9/3218 380/277 |
| 2007/0300080 | A1* | 12/2007 | Brown | H04L 9/0825 713/193 |
| 2008/0115208 | A1* | 5/2008 | Lee | H04L 9/3231 726/19 |
| 2009/0235069 | A1* | 9/2009 | Sonnega | H04L 63/062 713/156 |
| 2010/0017334 | A1* | 1/2010 | Itoi | G06Q 20/02 705/71 |
| 2010/0038424 | A1* | 2/2010 | Bashan | G06K 7/0095 235/439 |
| 2010/0138666 | A1* | 6/2010 | Adams | G06F 21/32 713/186 |
| 2010/0165981 | A1* | 7/2010 | Kuppuswamy | H04M 3/38 370/352 |
| 2010/0228990 | A1* | 9/2010 | Billings | G06F 21/78 713/185 |
| 2011/0107409 | A1* | 5/2011 | Wilkinson | G06F 21/41 726/8 |
| 2011/0202466 | A1* | 8/2011 | Carter | G06Q 20/3224 705/67 |
| 2011/0202755 | A1* | 8/2011 | Orsini | G06F 21/602 713/151 |
| 2012/0159590 | A1* | 6/2012 | Novack | G06F 21/32 726/7 |
| 2012/0272307 | A1* | 10/2012 | Buer | H04L 9/3234 726/9 |
| 2014/0258109 | A1* | 9/2014 | Jiang | G06Q 20/341 705/41 |
| 2014/0310516 | A1* | 10/2014 | O'Hare | H04L 63/029 713/156 |
| 2014/0316873 | A1* | 10/2014 | Sines | G06Q 30/0222 705/14.17 |
| 2014/0380445 | A1* | 12/2014 | Tunnell | H04L 63/18 726/7 |
| 2015/0095999 | A1* | 4/2015 | Toth | H04L 63/0823 726/6 |
| 2015/0319156 | A1* | 11/2015 | Guccione | H04L 63/205 726/7 |
| 2016/0006264 | A1* | 1/2016 | Alperin | H02J 50/80 307/104 |
| 2016/0020909 | A1* | 1/2016 | Gardenes Linan | H04L 9/3247 713/175 |
| 2016/0217280 | A1* | 7/2016 | Oberheide | H04L 63/18 |

OTHER PUBLICATIONS

ISO: "ISO/IEC 7816-8:2004 Identification Cards—Integrated Circuit Cards—Part 8: Commands for Security Operations", International Standards ISO, XX, XX, vol. 7816, No. 8, Jun. 1, 2004 (Jun. 1, 2004), pp. 1-19, XP008077623, section 5.1, 5.2 and 5.4 Appendix C.

* cited by examiner

METHOD FOR PROVIDING SECURE DIGITAL SIGNATURES

TECHNICAL FIELD

The invention relates to the field of secure data communications, and in particular to an enrolment procedure of a new user into a public key infrastructure, PKI.

BACKGROUND OF THE INVENTION

In the field of data communications, such as communications taking place over digital channels, the cryptographic concept of Public Key Infrastructures, PKI, is a well-known concept. A PKI is an arrangement that binds public keys with respective Subjects by means of a Certificate Authority (CA). Within a CA domain, each Subject, which is either a physical or legal person, or a web site or another type of asset, must be unique and unambiguously bound to/associated with a public key. This binding is typically represented by a Certificate that is issued by the CA and that contains the public key and a distinguished name of the Subject bound with. A Certificate which binds a given Subject to a public key is requested by a Subscriber which is a physical person that acts either on its own behalf or a legal person that has mandated a physical person as an authorized representative. In the most typical case, the Subscriber is identical with the Subject (when requesting a Certificate that identifies the Subscriber), but the Subscriber can also be the owner of the Subject (when requesting a Certificate for her/his connected device, website or another owned asset).

The purpose of a PKI is to facilitate the secure electronic transfer of information for a range of network activities such as e-commerce, internet banking and confidential email as well as reliable authentication to online services. This is required for activities where simple passwords are an inadequate authentication method and more rigorous proof is required to confirm the identity of the parties involved in the communication and to validate the information being transferred.

Once a unique binding between a Subject and a public key has been established, the corresponding private key that is cryptographically bound to the public key can be used to digitally sign data.

In any event, the Subscriber is responsible for authorizing the use of the private key while the Subject is the entity bound to the public key and the corresponding private key and thus authenticated by the private key.

In the context of a communication session between a user being in that case herself/himself the Subject and, for example, a banking institution, the data that is cryptographically signed via electronic means may be a randomly generated session identifier. By signing the session identifier, the communication session is uniquely linked to or associated with the user's identity. Alternatively, the user may cryptographically sign the data comprised in a document via electronic means, corresponding to the apposition of her/his written signature to a document presented on paper, in particular if the electronically created signature addresses the requirements of a qualified signature in virtue of Regulation 910/2014/EU.

A private key may be distributed to the Subscriber in the form of a smartcard having a microchip on which the private key is stored. In such case, the Subscriber may connect the smartcard to a computer device interfaced with an appropriate smartcard reading device, in order to enable the smartcard and auxiliary software of the computer device for digitally signing data.

Alternatively, a private key may be stored remotely on a protected server that is accessible via a safe data communication channel. In such a case, the Subscriber is typically supplied by the Certification Authority with a security token that implements a one-time-password, OTP, algorithm. The algorithm generally uses information binding the security token unambiguously to the Subject and to the remotely stored private key. On supplying credentials and a corresponding OTP to the remote infrastructure where the protected server with the private key is residing, the received OTP value is compared with the expected OTP value in addition to verification of other credentials before providing access to the server which stores the Subject's private key. This server may then be directed to digitally sign data using the stored private key. Such architecture provides the benefit of increased mobility. For example, once the user is in possession of an operable security token, she/he may access the private key from an arbitrary computing device without requiring a hardware interface or smartcard reader. Safe usage of a remotely stored private key may also be enabled by using mechanisms other than OTP or by using virtual tokens that may be implemented in software.

In both above-cited scenarios, a Subject (user) device, i.e. a smartcard comprising the private key, or a security token giving access to the remote private key, has previously been bound to/associated with the Subject and securely made available by the PKI to the Subscriber.

The security of any of the above-cited known approaches crucially relies on the correct identification of the Subject and the Subscriber and when necessary correct identification of a mandated physical person representative (and the corresponding mandate) and Subscriber's ownership of the Subject when the latter is different from the Subscriber and the correct binding of the Subject to the pair of cryptographic public and private keys and the secure provisioning of the Subject device giving access to the private key. This binding occurs at the stage of enrolment into a PKI.

Based on the fact that a PKI is considered by relying parties as trustworthy with respect to the above-cited processes and the employed Subject devices, relying parties can authenticate a Subject by validating a digital signature created with the Subject's private key and the corresponding Certificate issued by the given PKI.

In known enrolment methods, above-cited identification happens at the beginning of the process. For this purpose, the Subscriber or an authorized physical person representative provides attributes which characterize her/him and the Subject and when required the organization in which name she/he is acting. Those attributes may be accompanied by additional artefacts (e.g., webcam interview, driving license, national identification card, etc., which serve as evidence for validating the provided attributes. The identifying party, typically an authorized agent and/or computing means of the PKI's Registration Authority, RA, validates the claimed attributes and supplies upon successful outcome a certified set of attributes to the Certification Authority, CA, for issuing a corresponding Certificate to the Subject.

At this stage a public/private cryptographic key pair, which has been randomly created in a smartcard or in another kind of device or on a protected server, is associated with the identified Subject. The result is manifested by issuing a Certificate comprising the public key together with a distinguished name of that Subject. As described here above, the corresponding private key, which is consequently also associated with the given Subject, is then securely made accessible to the Subscriber by distributing the corresponding Subject device (smartcard, security token, . . . ) via a secured communication channel or via other secured allocation mechanism for enabling access to the private key.

As the attributes used to identify the Subject and the Subscriber and when required an authorized physical person representative may possibly be supplied during the enrolment process over distinct remote channels, for example over the Internet, it is crucial to make sure that the provided attributes originate from the same requestor and have not been tampered with. To address these security requirements, the known identification methods are usually difficult and cumbersome for all involved parties.

A further potential weakness resides in the fact that a Subject device with the previously associated private key is required to be made available to the corresponding Subscriber in a safe manner. Indeed the private key may be stored on the Subject device itself or the private key may be stored remotely and cryptographically linked to a security token, with the Subject previously linked to that private key. Supplying this device to the appropriate Subscriber factually also creates a physical binding between the device, with which the private key is associated, and the Subject, thus the device representing something the Subscriber or an authorized representative of the Subscriber has or possesses. In order to make the supplied device usable, an additional security factor (a secret password or PIN that is known by the Subscriber, or a biometric factor that belongs to the Subscriber) is typically required to be activated before the device becomes operable and access to the associated private key granted. The secret password or PIN represents something (only) the Subscriber or its authorized representative knows. The biometric factor represents something (only) the Subscriber or its authorized representative is. Indeed, if a usable device with a private key and a Subject being associated to that private key would be hijacked without making the device securely and exclusively accessible to the authorized user, the hijacker would be able to act with a false identity, i.e., the identity previously linked to the hijacked private key.

Therefore, it is customary to provide the Subscriber with activation passwords or PINs via separate secure channels, which consequently renders provision of the device to which the private key is associated complex and inconvenient, yet still potentially prone to attacks. Indeed, if a password or PIN is transmitted for example by Short Message Service, SMS, the corresponding message may be intercepted by the hijacker, who also may get hold of the device. In doing so, the hijacker would possess all the necessary means to act as the Subject previously linked to the device.

Technical Problem to be Solved

It is an objective to present a method and device, which overcomes at least some of the disadvantages of the prior art. Specifically, it is an objective of the invention to mitigate the risks of man-in-the middle attacks when making private keys accessible to an authorized party, by reducing the number of security-critical data transmissions. It is a further object to provide electronic/digital signatures with an increased level of assurance.

SUMMARY OF THE INVENTION

It is an objective of the invention to provide a method for digitally signing data using a cryptographic key in a communication network comprising a server node and at least one further network node.

The method comprises the following steps:
a) generating a cryptographic public key/private key pair using cryptographic key generation means, wherein said key pair is not associated with a Subject;
b) at the server network node, storing said public key in a public key store, and
c) storing said private key in a private key store, access to which is granted using a predetermined associated primary authentication factor and at least one yet undefined supplementary authentication factor;
d) subsequently providing an unidentified user, the Subscriber, with said primary authentication factor, said Subscriber being associated with an identifiable Subject yet unknown to the server node;
e) associating at least one supplementary authentication factor with said private key store, wherein said supplementary authentication factor comprises data proprietary to said Subscriber, thereby uniquely associating said private key store and said key pair to the Subject associated with said Subscriber;
f) subsequently receiving, at the server node from at least one network node, data identifying said Subscriber and the associated Subject, said data being cryptographically signed with said private key using digital signature creation means;
g) at the server node, validating said received data, and associating the so-provided Subject with said key pair;
h) at any one of said network nodes, causing data to be cryptographically signed with said private key using digital signature creation means, said signed data being certifiable to have been signed by said Subject, based on the corresponding public key and the Subject associated therewith.

In step (e), the data proprietary to said Subscriber (i.e. the at least one second authentication factor) exclusively originate from said Subscriber, i.e. is independent from the first authentication factor.

Advantageously, step (e) is done only once. Still advantageously, after execution of step (e) the Subscriber can provide evidence to solely control the first and second independent authentication factors for employing said private key of said private/public key pair.

Preferably, at step (d), the primary authentication factor for accessing said private key store may be provided to said unidentified user/Subscriber over an unsecured communication channel.

Preferably, after step (e), said private key store and private key becomes accessible for said unidentified Subscriber due to keeping a required number of authentication factors;

The private key store may preferably comprise a cryptographically secure storage environment, such as a cryptographically secure memory element.

The primary authentication factor may preferably comprise a tamper resistant physical device. Alternatively, the primary authentication factor may preferably comprise tamper resistant program code means. The wording "tamper resistant" is used to describe a device or program code, which is difficult or hard to break into or to be altered and which at least satisfies the security requirements for achieving the desired level of assurance.

Preferably, said tamper resistant device or program code means may comprise said cryptographic key generation means, said private key store and said digital signature creation means. Said tamper resistant device or program code means may further preferably be configured for transmitting said generated public key to said server node after step (a), for storing it in said public key store.

Said server node may preferably comprise said cryptographic key generation means.

Said tamper resistant device or program code means may preferably comprise said private key store and said digital signature creation means. Said server node may preferably be configured for storing said generated private key in said private key store at step (c).

Said server node may preferably comprise said private key store and said digital signature creation means. Said tamper resistant device or program code may preferably comprise data required for accessing said private key store via a secure data communication channel, wherein said data is not associated with a Subject. The device may comprise a security token. The device may be configured to execute a one-time-password algorithm synchronized with said server node.

Preferably the tamper resistant device may comprise a microchip. The tamper resistant device may preferably comprise a smartcard configured to interface with a network node.

In step (e), the supplementary authentication factor may preferably be transmitted from a network node to said server node via a secure data communication channel. Preferably, only data for validating the supplementary authentication factor are sent to said server node. Alternatively, if the supplementary authentication factor is validated in the tamper resistant device, provided that the reliability of the data communication channel between said second and third network node can guarantee a sufficient level of security, transmission of the supplementary authentication factor or data for validating it becomes obsolete.

Alternatively, in step (e), the supplementary authentication factor may preferably be stored in said tamper resistant device or program code means. Information or data for validating said authentication factor may preferably be transmitted from a network node to said server node via a secure communication channel.

Step (f) may preferably be repeated until sufficient data for validating said Subscriber and Subject have been received at said server node.

Step (f) may preferably be repeated until sufficient identification data have been received at said server node.

The server node may be a computing device. Alternatively, the server node may comprise a plurality of computing devices or network nodes interconnected using a communication network. The computing and memory resources of said plurality of computing devices may be aggregated as a virtual machine. The digital signature creation means, key generation means or validation means for said second authentication factor, may for example be physically located on distinct computing devices or network nodes, which are interconnected to form an aggregated server node in accordance with the present invention.

The cryptographic generation means and digital signature creation means may preferably be implemented by a processor of a computer, or its equivalents.

Preferably, the public key store may be configured for holding at least one public key and is accessible to other network nodes in said communication network.

The private key store may preferably be configured for holding only said private key. The private key store may be configured for holding a plurality of private keys, wherein each key is associated with the same Subject.

Preferably, the server node may comprise a Registration Authority, RA, and/or a Certification Authority, CA, of a Public Key Infrastructure, PKI.

The public key store may preferably comprise a Certificate store, and said public key may preferably be comprised in a Certificate, which is stored in said Certificate store.

In step (b) a first Certificate comprising said public key, but not including an associated Subject, may preferably be stored in said Certificate store. In step (g), a Subject may be associated with said first Certificate, or said first Certificate may be replaced by a second Certificate comprising said public key and said Subject association (by preferably at the same time revoking said first Certificate).

The supplementary authentication factor may preferably comprise a password, a personal identification number, PIN, or biometric data relating to said unidentified Subject and/or Subscriber, or any combination thereof.

The identifying data may preferably comprise a national identification card or passport data, digital video information, or biometric information relating to said user, excerpt from the commercial register, other identification evidences or any combination thereof.

According to a further aspect of the invention, there is provided a computer program comprising computer readable code means, which when run on a computer, causes the computer to carry out the method according to the invention, or any subset of the steps of said method.

According to another aspect of the invention, there is provided a computer program product comprising a computer-readable medium on which a computer program according to the invention is stored.

According to yet another aspect of the invention there is provided a computer configured for carrying out the method according to the invention, or any subset of the steps of said method.

According to a final aspect of the invention, there is provided a device comprising processing means and a memory element, data transmission and data reception means for transmitting and receiving data using a data communication channel, and a public key store, wherein said processing means are configured for performing at least steps (b), (d), (f) and (g) according to the invention.

The processing means may be a processor unit of a computer, while the data transmission and data transmission means may comprise a data communication or networking interface of a computer, or its equivalents.

Preferably, the device may further comprise cryptographic key generation means.

Preferably, the device may further comprise a private key store and digital signature creation means, wherein said processing means are further configured for performing steps (a) and (c) according to the invention.

By using the present invention, it becomes possible to improve the security and reliability of digital signatures in the context of PKI infrastructures. Specifically, the proposed protocol removes the requirement of transmitting a device to which a private key and a Subject is unambiguously associated to a user via a first communication channel, while providing an activation code (password, PIN, etc.) via a separate second communication channel to the same user. This is rendered possible because in accordance with the invention, the provided device is only associated with a private key, but not yet associated with any Subject before it is distributed to a user. In fact, the private key/public key pair that is generated may be considered to be generic, and any yet unidentified user may be supplied with it over an unsecured channel. Once a user is in possession of a primary authentication factor for giving access to the key pair, the primary factor being for example the device associated with the generic pair of randomly generated keys, she/he augments it with at least one supplementary authentication factor, i.e. a password, a PIN or a biometric factor. Only at this stage, the device and its associated private key become operable for digital signing purposes for the user that provided the supplementary authentication factor, yet the user is still unidentified. However, only the user knowing or having the supplementary authentication factor and being at the same time in possession of the device may authorize use of the private key to digitally sign data, so that any data cryptographically signed with the obtained private key is certain to have been issued by the same unidentified user. This feature is further exploited to provide the PKI with attributes and artefacts aiming at identifying said unidentified user and the Subject when different and when required the organization in which name the user is acting. By means of a computing device, the user cryptographically signs these attributes and artefacts with the private key to which she/he has obtained exclusive access, and transmits the digitally signed data using a data communication channel to the PKI. The PKI, having access to the corresponding public key, is capable of unambiguously attributing the received artefacts and attributes to the same requestor/user by means of validating the signature(s) adhered to the transmitted data, provided that provisions are made to avoid replaying transmissions (e.g. by the PKI enforcing inclusion of a unique random session number with each transmission, however with the particularly employed protection mechanism being out of the scope of the invention). This unambiguous attribution is achieved without incurring any further data transmission and/or additional protection measures, as opposed to state of the art methods. Upon verification of the received data, the PKI is ready to certify the Subject, with the underlying identification process and needed artefacts being out of the scope of the invention. At this stage, the PKI binds the Subject to the public/private key pair using a Certificate. A strong link between the Subject and the key pair has been obtained. The key pair ceases to be generic and may be used to verifiably digitally sign any data. The Subject has been enrolled into the PKI.

In summary, compared to state of the art techniques, the invention mitigates the risks of man-in-the-middle attacks in the context of Subject device and public key distribution methods, thereby inherently enhancing the trustworthiness of Certificates issued by a PKI. This is achieved by reducing the number of security-critical data transmissions and by inversing identification process and Subject device provision with respect to prior art. Further, the distribution of devices (i.e. smartcards comprising private keys or means for accessing private keys) is greatly facilitated, as only generic devices, which are not yet linked to any Subject, can be distributed over unsecure channels.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

The following description focuses on those features which are critical for the method according to the invention to be implemented, and which are not known from the state of the art. Any implementation of the method also relies on concepts as such well-known in the art, which will not be described in detail for the sake of clarity. Such well-known concepts include for example, but are not limited to, the generation of public/private cryptographic key pairs. The use of cryptographic schemes for private and public keys shall not be limited in the sense of being based on currently largely adopted cryptographic schemes like RSA or elliptic curves only. Also other schemes may be employed.

It should be noted that features described in the context of a specific embodiment described herein can be combined to the features of other embodiments unless the contrary is explicitly mentioned. The description of features that are identical throughout several embodiments is generally not repeated for each such embodiment. The description of different embodiments focuses on the differences between such embodiments.

The method according to the invention takes place in a communication network connecting a server node 110 to a plurality of user nodes 120, which may be considered as Subject devices or terminals, using possibly heterogeneous data communication channels.

In the context of the invention, a Subscriber is either a physical person that acts on its own behalf or an organization, i.e., a legal person, which may be represented by a mandated physical person.

A Subject is the entity that, at the end of the process in accordance with the invention, is certified by the Certificate issued by the PKI. A Subject can be either the Subscriber herself/himself, or an asset that is owned by the Subscriber, such as a portable device for example.

The Subscriber is responsible for respecting the security requirements and in particular for properly managing the authentication factors of the Subject device, as outlined here below, which is used by the Subject for signing purposes.

Figure 1:
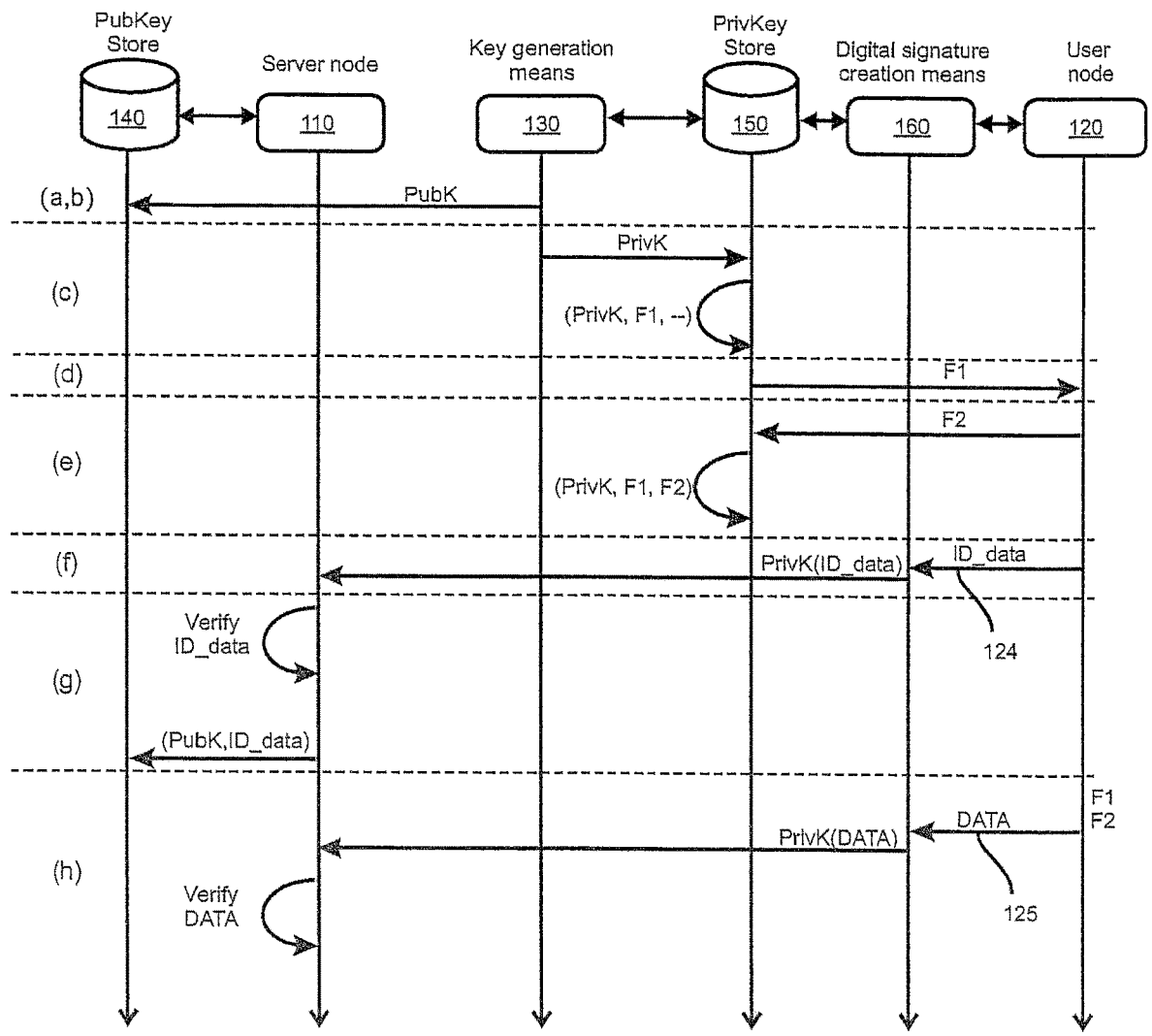
FIG. 1 illustrates sequence of the main steps of the method according to a preferred embodiment, including the main entities involved in these steps.

A first preferred embodiment of the method according to the invention comprises the following steps as outlined in FIG. 1. In step (a) a cryptographic public key/private pair is generated using cryptographic key generation means 130. The key generation means may comprise a cryptographic key generator or general processing means of a computing device, which are configured for generating a cryptographic key pair. Algorithms for generating such pairs of keys are well-known in the art and will not be described in detail in the context of the present invention. The generated pair of keys is not associated with/bound to any Subject's identity. It may therefore be considered as a generic pair of keys, which may be freely distributed, without risking compromising a specific user's pair of keys. Nevertheless, distribution must be organized in a way that copying of the private key can effectively be prevented in any context, meaning that the private key exists at any time only once. The public key can be distributed over non-secure channels but the corresponding private key must be stored in a safe private key store via a secure channel only, or directly be generated inside a secure private key store.

In step (b), the public key is stored in a public key store 140 at a server node 110. The public key store may preferably be configured for storing a plurality of public keys. The server node may be a single server in a communication network, or an aggregation of several servers in a communication network providing the services required by the server node. The public key store 140 comprises a memory element, such as a structured memory element or a database, to which all nodes in the communication network have open access. As such, the server node 110 has read/write access to the public key store 140. The public keys may advantageously be stored in the form of security Certificates, which are generally used to certify that a public key belongs to a specific user. In the case of the present invention, at steps (a) and (b), the public key may be stored in a Certificate that specifically does not contain any information about a specific user. If a user name is required by the Certificate's data format, a pseudonym or generic placeholder may be associated with the public key that has been generated. The Certificate may be a technical Certificate. In any case, it should be noted that prior to the subsequent steps of the method according to the invention, the Certificate is not owned by any specific user.

In step (c), the generated private key is stored in a private key store 150. The private key store is preferably configured for holding only a single generated private key. Nevertheless, provision of multiple key pairs for the same user is an alternative option within the scope of the present invention, which consequently requires the private key store being capable to store several private keys for a given user. Nevertheless (but without limitation), the subsequent description abstracts from this alternative option and assumes for the sake of simplicity a single private key being stored in the user's private key store. Access to the private key store 150, and therefore to the private key contained therein, is granted to a user or network node conditional on proof of possession of a predetermined primary authentication factor F1, and at least one supplementary/secondary authentication factor. The private key is neither directly accessible to the user nor to any other party. Rather, the user interacts with digital signature creation means, which use the private key that is stored in the secure private key store.

It should be noted that at step (c), the primary authentication factor is predetermined, for example by the server node, while the supplementary authentication factor(s) is(are) yet undefined. These will be defined later by a user.

Step (c) may be performed prior to step (b) without leaving the scope of the present invention.

At step (d), an unidentified user, the Subscriber, which may be a physical or a legal person, is provided with the primary authentication factor. The Subscriber is associated with an identifiable Subject, which is however yet unknown to the server node. The Subscriber may be identical to the Subject, or the Subject may be an asset owned by the Subscriber. The provision of the primary authentication factor F1 may take place using an unsecure communication channel. Preferably, the primary authentication factor comprises a physical device associated with the generated pair of keys, so that the provision of the factor F1 puts the unidentified user in the position of possessing something only she/he possesses.

The content of the private key store only becomes accessible once at least one supplementary authentication factor F2 has been defined.

Therefore, the unidentified user/Subscriber augments the security level on the private key store 150 obtained through the provision of the primary authentication factor F1, by defining a supplementary authentication factor, F2. This supplementary factor may be something only she/he knows, e.g. a password or PIN, or something only she/he is, e.g. biometric information relating to her/his person or body. At this stage, the private key becomes accessible for said unidentified user/Subscriber (and only to her/him) due to being in keeping of the required number of authentication factors. It should be noted that, contrary to known private key distribution schemes, the supplementary authentication factor(s), e.g. an initial password or PIN, do not need to be transmitted from a central entity to a user using a distinct and secure communication channel. This stems from the fact that the yet unidentified user binds the private key to herself/himself on her/his own initiative. At this stage of the process, only the unidentified user may use the private key she/he has obtained. This corresponds to step (e), with performing this latter step being a pre-requisite for the private key to become actually accessible. In all embodiments, the authentication factor F2, or at least data that allows to validate the authentication factor F2, should be available on a network node implementing the authentication factor validation functionality.

In step (f), data 124 identifying the yet unidentified user is caused to be digitally signed with the private key at a user node (network node) 120. Only a single user has access to said private key. The cryptographically signed data is transmitted using a data communication channel to the server node 110, which has access to the corresponding public key. Therefore, the server node 110 is able to verify that any data that may be validated using said public key originates from the same yet unidentified user. Upon verification of the provided data, which may comprise passport information, video information depicting the user, other identification data concerning the user, the Subscriber when different from the user and the Subject and complementary evidences as needed (like a mandate), the server node 110 is in a position to unambiguously identify that the received data has originated from the user being in possession of said primary authentication factor and having additionally associated at least a second authentication factor provided by oneself. The so-identified Subject is associated with the public key in the public key store. If the public key is stored in a Certificate, the corresponding Certificate, which so far did not bind any Subject, is then either bound to the identified Subject or replaced by a new Certificate to include the so-provided and validated identity data and at the same time revoking the unbound Certificate. This corresponds to step (g). The private key, being implicitly bound to the public key, is indirectly linked to the same Subject. At this stage, the identified user uniquely and unambiguously possesses the Certificate.

At this stage of the process, a strong link has been established between the Subject and the generated private/public key pair. The link has been established without requiring transmission of a primary authentication factor over a first secure channel, and transmission of corresponding activation data over a second secure channel, as known in the art. The security of the protocol aiming at the distribution of the private key to a user is enhanced as the proposed protocol involves less security-critical data transmissions than protocols known in the art, each such transmission being potentially prone to eavesdropping by a malicious third party. In the case of the variant where only validation data for a second factor have to be transmitted or when a second factor is validated locally in the Subject device, no security-critical data transmissions are required.

At step (h), data 125 is caused to be cryptographically signed using said private key using digital signature creation means 160 at any network node 120. This step may be repeated as needed, once the previous steps have been carried out successfully. The signed data is certifiable to have been signed by said hitherto identified Subject based on the corresponding public key associated therewith in the public key store. The signed data may be a communication session identifier, data relating to a business contract or any other data.

As a consequence, any digital signature made with the private key that has been linked to the Subject using the above steps, is inherently more secure and trustworthy than digital signatures made with a private key that has been distributed using methods known in the art.

Figure 2:
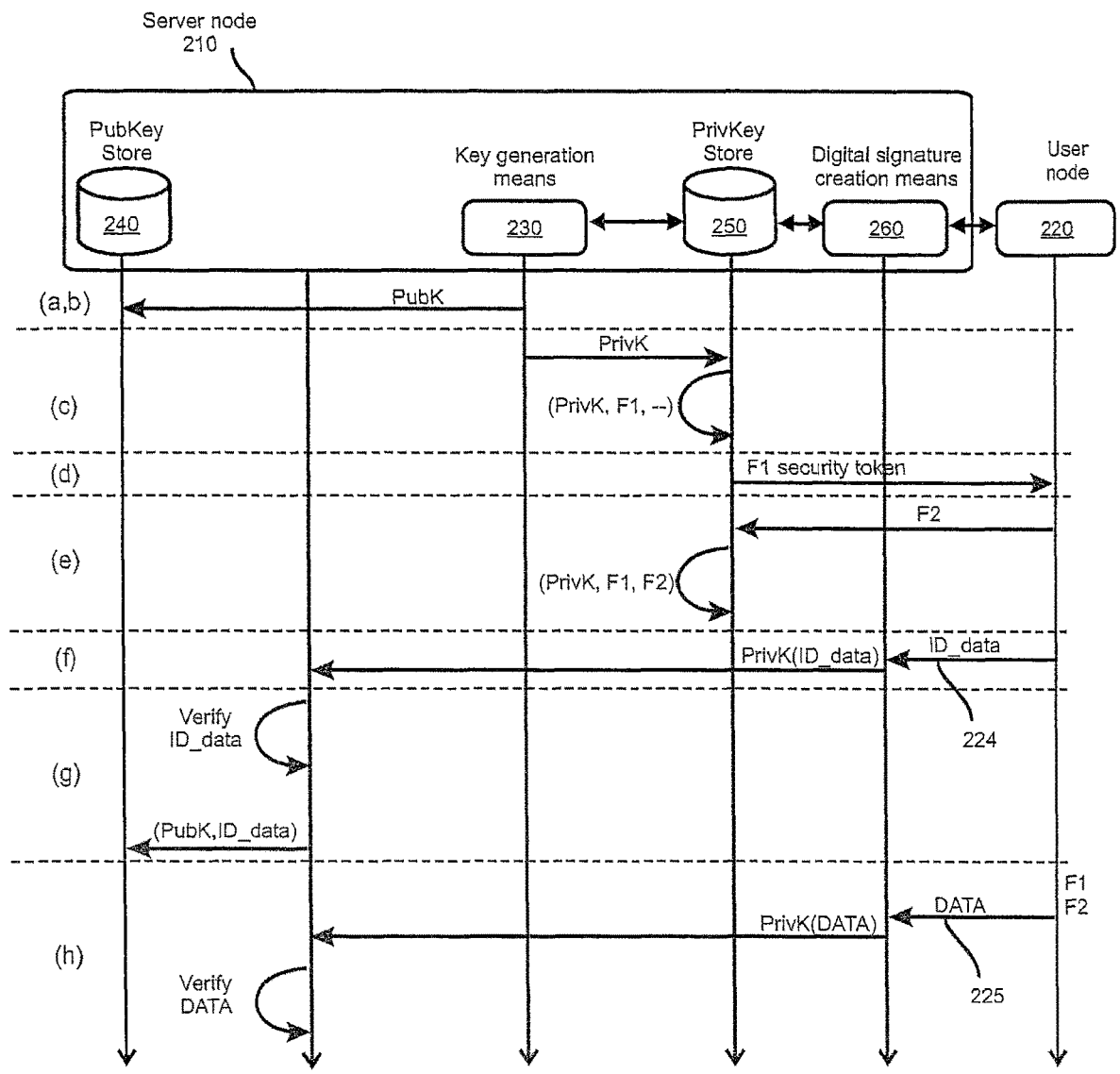
FIG. 2 illustrates sequence of the main steps of the method according to a preferred embodiment, including the main entities involved in these steps.

With reference to FIG. 2, a second preferred embodiment of the method according to the invention is described. In step (a) a cryptographic public key/private pair is generated using cryptographic key generation means 230. According to this embodiment, the key generation means 230 may comprise a cryptographic key generator or general processing means that are part of the server node 210, or part of a Public Key Infrastructure, PKI. In an alternative implementation, the key generation means may be implemented by a dedicated network node which provides one of the services of the described server node 210. The processing means are configured for generating a cryptographic key pair. The generated pair of keys is not associated with/bound to any Subject. It may therefore be considered as a generic pair of keys, which may be freely distributed without risking compromising a specific Subject's pair of keys.

In step (b), the public key is stored in a public key store 240, also local to the server node 210 or PKI. Again, the public key store may alternatively be located on a dedicated network node, which contributes to the provision of the services of the described server node 210.

In step (c), the generated private key is stored in a private key store 250. The private key store is preferably configured for holding only a single generated private key, although alternative configurations for storing multiple private keys may be possible without leaving the framework of the present invention. In this embodiment, the private key store 250 as well as the digital signature creation means 260 are preferably local to network node 210 or PKI. Alternatively, the private key store and digital signature creation means may be implemented by a dedicated network node, which contributes to the provision of the described server node's services. Access to the private key store 250, and therefore to the private key contained therein, is granted to a user or network node conditional on proof of possession of a predetermined primary authentication factor F1, and at least one supplementary/secondary authentication factor. It should be noted that at step (c), the primary authentication factor is predetermined, for example by the server node, while the supplementary authentication factor(s) is(are) yet undefined. In accordance with this embodiment, the primary authentication factor F1 is a security token device, which preferably implements a one-time-password algorithm, with a generated OTP being verifiable by the server node 210 in order to supply one of the factors needed for granting access to the private key store 250 at network node 210. Other authentication mechanisms are conceivable without leaving the framework of the present invention.

The order of steps (b) and (c) may be inverted without leaving the scope of the present invention.

At step (d), an unidentified user is provided with the primary authentication factor in the form of the security token. The security token thus becomes something only the yet unidentified user possesses.

The unidentified user augments the security level on the private key store 250 obtained through the provision of the security token, by defining a supplementary authentication factor, F2. This supplementary factor may be something only she/he knows, e.g. a password or PIN, or something only she/he is, e.g. biometric information relating to her/his person or body. The supplementary authentication factor may for example be associated with the private key store 250 through a web-based front end of the server node 210 or PKI, which the user may use to provide the supplementary authentication factor. At this stage of the process, only the unidentified user may use the private key he has obtained. This corresponds to step (e). Steps (f) to (g) correspond to the first described embodiment.

At step (h), data 225 is caused to be cryptographically signed by the server node 210 using said private key and the digital signature creation means 260, which are located at, or accessible from, the server node 210. Access to the private key is granted by the server node 210 upon successful validation of the supplied authentication factors, with the server node 210 thus complying with the request and digitally signing the received data on the Subject's behalf. The signed data is certifiable to have been signed by said hitherto identified Subject based on the corresponding public key and the Subject associated therewith in the public key store.

Step (h) may be repeated as required by a specific application, after the preceding steps have been carried out successfully once.

Figure 3:
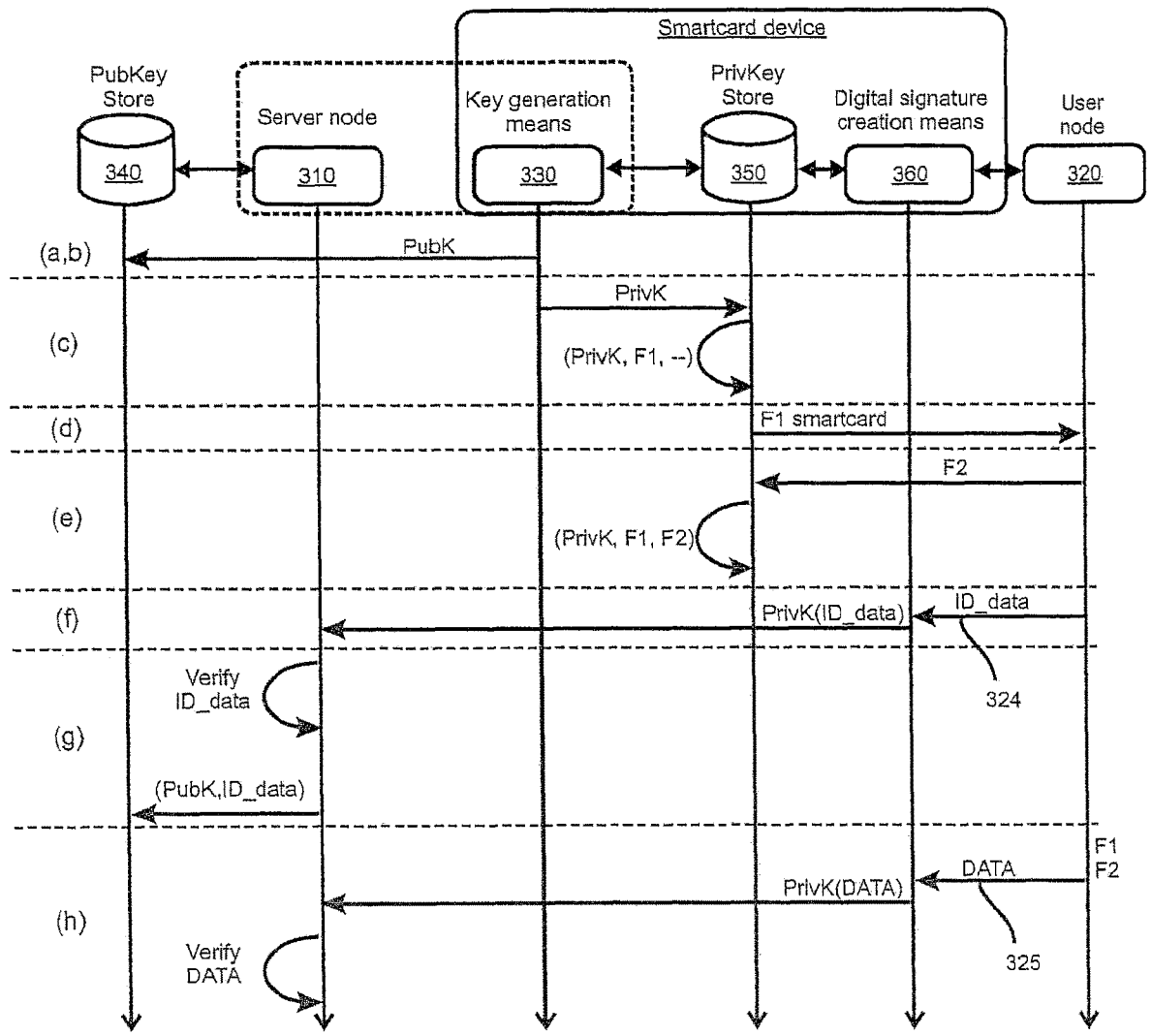
FIG. 3 illustrates sequence of the main steps of the method according to a preferred embodiment, including the main entities involved in these steps.

With reference to FIG. 3, a third preferred embodiment of the method according to the invention is described. In step (a) a cryptographic public key/private pair is generated using cryptographic key generation means 330. According to this embodiment, the key generation means 330 may comprise a cryptographic key generator or general processing means that are part of a smartcard device. Alternatively for the present embodiment, the smartcard device may be a hardware cryptographic module, HSM, or a secure software application. The processing means are configured for generating a cryptographic key pair. The generated pair of keys is not associated with/bound to any Subject. It may therefore be considered as a generic pair of keys, which may be freely distributed, via distribution of the smartcard device, using non-secure communication channels, without risking compromising a specific user's pair of keys.

In step (b), the public key is stored in a public key store 340, local to the server node 310 or PKI. The public key, which is generated by the smartcard device, may to this aim be transmitted from a computing device interfaced with the smartcard device, to server node 310 or PKI.

In step (c), the generated private key is stored in a private key store 350. The private key store is configured for holding only a single generated private key. In this embodiment, the private key store 350 and the digital signature creation means 360 are preferably local to said smartcard device. The order of steps (b) and (c) may be inverted.

In an alternative embodiment of the above steps, the key generation means may comprise a cryptographic key generator or general processing means that are part of the server node or part of a Public Key Infrastructure, PKI. After generation of the pair of keys in step (a), the private key may in that case be stored in a private key store 350 that is local to said smartcard device. Such an alternative is indicated by ways of the dashed regrouping of the server node 310 and the key generation means 330 in FIG. 3. The injection of the private key into said smartcard device takes preferably place at the server node 310 using a secure data communication channel. The step of transmitting the public key back to the server node is obsolete in this alternative embodiment, as the public key is already available on the server node following its generation. As described here above, the smartcard device also comprises the digital signature creation means.

Access to the private key store 350, and therefore to the private key contained therein, is granted to a user or network node conditionally due to being in possession of said smartcard device implementing said predetermined primary authentication factor F1, and at least one supplementary/secondary authentication factor. At this stage, the supplementary authentication factor(s) is(are) yet undefined.

At step (d), an unidentified user is provided with the primary authentication factor in the form of the smartcard device. The smartcard device thus becomes something only the yet unidentified user possesses. The yet unidentified user may interface the smartcard with a computing device 320 using appropriate interfacing means (e.g. an embedded or connected reader) and drivers as such known in the art.

The smartcard device is preferably configured so that upon first access by any user, the said user is required to augment the security level on the private key store 350 obtained through the provision of the smartcard itself, by defining a supplementary authentication factor, F2. This supplementary factor may be something only she/he knows, e.g. a password or PIN, or something only she/he is, e.g. biometric information relating to her/his person or body. The provided credentials may preferably be stored in a secure memory element of the smartcard. At this stage of the process, only the unidentified user may use the private key he has obtained. This corresponds to step (e). Steps (f) to (g) correspond to the first described embodiment.

At step (h), data 325 is caused to be cryptographically signed by the smartcard or alternative device using signature creation means 360 and private key stored in local private key store 350. Access to the private key is granted by the user node 320 providing second authentication factor F2, with the primary factor F1 implicitly being provided due to the smartcard or alternative having been made available to the user node 320 in step (d) beforehand. The signed data is certifiable to have been signed by said hitherto identified Subject based on the corresponding public key and the Subject associated therewith in the public key store. The signed data may be a communication session identifier, data relating to a business contract or any other data.

Figure 4:
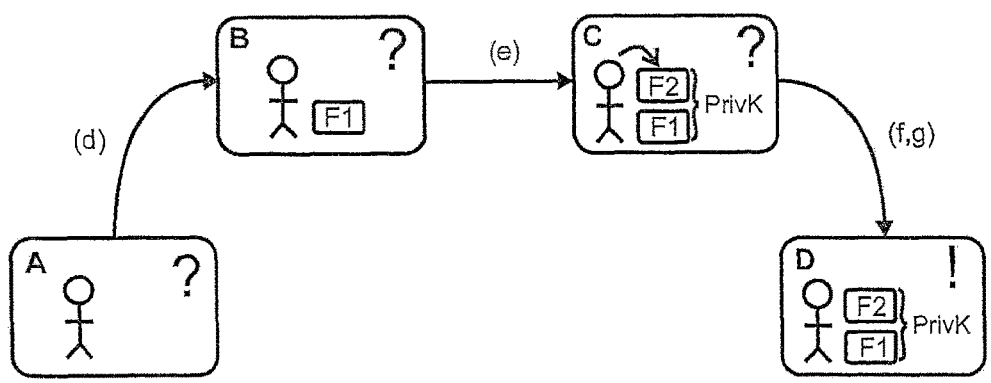
FIG. 4 is a state diagram, which illustrates the knowledge an enrollment entity has about a user (Subscriber) throughout the main steps of the method according to a preferred embodiment of the invention.

In order to gain further insight to the invention, FIG. 4 illustrates a state diagram having four states A, B, C and D. Each state corresponds to a user's state as seen by network node 110 or PKI. For the sake of this illustrate example, it is supposed that in state A, the user/Subscriber is unidentified and does not possess any of the authentication factors F1, F2 required to access the private key store in which the generated private key, which is not yet bound to any Subject, is stored. As the user is not yet identified, state A is marked with a question mark "?". Upon transmission of the primary authentication factor F1 to the user, corresponding to step (d) as described here above, the user's state changes from A to B. In state B, the user is still not identified to the PKI, but she/he possesses a first element required to access the private key store 150. This first element may be a security token, a smartcard device, or any other primary authentication factor. Upon providing her/his own credentials as a supplementary authentication factor F2, corresponding to step (e) of the invention, the user's state changes from B to C. In this state, the user is still not identified to the PKI, but she/he, and only she/he, has access to the private key contained in the private key store 150. Following steps (f) and (g) according to the invention, the PKI is able to verify the user's (and/or Subscriber's) identity and associate the Subject that is identified at the same step unambiguously and uniquely with the key pair. The user's state changes from C to D. In this state, the PKI has identified the user (and/or Subscriber) and the Subject, indicated by the exclamation mark "!". The PKI is able to certify that any data digitally signed by the private key may be attributed to the Subject, which is strongly linked to the private key as a result of the preceding steps. The Subject has been enrolled into the PKI.

Other modalities than a security token or a smartcard device may be envisaged to implement the primary authentication factor as outlined here above. For example, access to a software key store may be provided using a specific software application, which may for example be run on a smartphone. In particular, such a software application may comprise program code means that implement the private key store and the means for creating a digital signature using the private key stored in said private key store. The provision of such a software application to an unidentified user is an implementation of step (d) of the method as described herein. As the private key is not yet bound to any Subject, the distribution of the software application may be performed by using an unsecure data communication channel. For example, the user may download a corresponding software application from a providing server on the Internet. While initializing the software application on her/his computing device or smartphone, the user may augment the security level of the given software application using her/his credentials, thereby providing the required supplementary authentication factor. Other modalities, such as a hardware security module, may be equally envisaged by the skilled person without departing from the scope of the present invention.

It should be understood that the detailed description of specific preferred embodiments is given by way of illustration only, since various changes and modifications within the scope of the invention will be apparent to the skilled man. The scope of protection is defined by the following set of claims.

The invention claimed is:

1. A method for digitally signing data using a cryptographic key in a communication network comprising a server node and at least one further network node, the method comprising the following steps:
   (a) generating a cryptographic public key/private key pair using a cryptographic key generator, wherein said key pair is not associated with any Subject's identity;
   (b) at the server node, storing said public key in a public key store, and
   (c) storing said private key in a private key store, access to which is granted using a predetermined associated primary authentication factor and at least one yet undefined supplementary authentication factor;
   (d) subsequently providing an unidentified user, the Subscriber, with said primary authentication factor, said Subscriber being associated with an identifiable Subject yet unknown to the server node;
   (e) defining the at least one yet undefined supplementary authentication factor in association with said private key store with data chosen by, and proprietary to, said Subscriber, thereby uniquely associating said private key store and said key pair to the Subject associated with said Subscriber;
   (f) subsequently receiving, at the server node from at least one network node, data identifying said Subscriber and the associated Subject, said data being cryptographically signed with said private key using a digital signature creator;

(g) at the server node, validating said received data, and associating the so-identified Subject with said key pair;

(h) at any one of said network nodes, causing data to be cryptographically signed with said private key using the digital signature creator, said signed data being certifiable to have been signed by said Subject, based on the corresponding public key and the Subject associated therewith.

2. The method according to claim 1, wherein at step (d), the primary authentication factor for accessing said private key store is provided to said unidentified user over an unsecured communication channel.

3. The method according to claim 1, wherein said primary authentication factor comprises a tamper resistant device or a program code device, said tamper resistant device or program code device comprises said cryptographic key generator, said private key store and said digital signature creator, and wherein said tamper resistant device or program code device is configured for transmitting said generated public key to said server node after step (a), for storing it in said public key store.

4. The method according to claim 1, wherein said server node comprises said cryptographic key generator.

5. The method according to claim 3, wherein said tamper resistant device or program code device comprises said private key store and said digital signature creator, and wherein said server node is configured for storing said generated private key in said private key store at step (c).

6. The method according to claim 3, wherein said server node comprises said private key store and said digital signature creator, and wherein said tamper resistant device or program code device comprises data required for accessing said private key store via a secure data communication channel, wherein said data is not associated with a Subject.

7. The method according to claim 3, wherein the tamper resistant device comprises a smartcard configured to interface with a network node.

8. The method according to claim 1, wherein in step (e), the supplementary authentication factor is transmitted from a network node to said server node via a secure data communication channel.

9. The method according to claim 3, wherein in step (e), the supplementary authentication factor is stored in said tamper resistant device or program code device, and wherein information for validating said authentication factor is transmitted from a network node to said server node via a secure communication channel.

10. The method according to claim 1, wherein step (f) is repeated until sufficient data for validating said Subscriber and Subject have been received at said server node.

11. The method according to claim 1, wherein said public key store is configured for holding at least one public key and is accessible to other network nodes in said communication network.

12. The method according to claim 1, wherein said private key store is configured for holding only said private key, or a plurality of private keys, wherein each key is associated with the same Subject.

13. The method according to claim 1, wherein said server node comprises a Registration Authority, RA, and/or a Certification Authority, CA, of a Public Key Infrastructure, PKI.

14. The method according to claim 1, wherein said public key store comprises a Certificate store, and wherein said public key is comprised in a Certificate, which is stored in said Certificate store.

15. The method according to claim 14, wherein in step (b) a first Certificate comprising said public key, but not including an associated Subject, is stored in said Certificate store, and wherein in step (g), a Subject is associated with said first Certificate, or said first Certificate is replaced by a second Certificate comprising said public key and said Subject association, while at the same time revoking the first Certificate.

16. The method according to claim 1, wherein said at least one supplementary authentication factor comprises data that said Subscriber knows, like a password, a personal identification number PIN, or data that said Subscriber is, like biometric data, or any combination thereof.

17. The method according to claim 1, wherein the data identifying said Subscriber and Subject comprises passport data, digital video information, an excerpt of a commercial register, or biometric information relating to the Subscriber and Subject, or any combination thereof.

18. A computer program product comprising computer readable code embedded in a non-transitory computer readable medium, which when run on a computer, causes the computer, for digitally signing data using a cryptographic key in a communication network comprising a server node and at least one further network node, to carry out the following steps: (a) generating a cryptographic public key/private key pair using a cryptographic key generator, wherein said key pair is not associated with any Subject's identity; (b) at the server node, storing said public key in a public key store, and (c) storing said private key in a private key store, access to which is granted using a predetermined associated primary authentication factor and at least one yet undefined supplementary authentication factor; (d) subsequently providing an unidentified user, the Subscriber, with said primary authentication factor, said Subscriber being associated with an identifiable Subject yet unknown to the server node; (e) defining the at least one yet undefined supplementary authentication factor in association with said private key store with data chosen by, and proprietary to, said Subscriber, thereby uniquely associating said private key store and said key pair to the Subject associated with said Subscriber; (f) subsequently receiving, at the server node from at least one network node, data identifying said Subscriber and the associated Subject, said data being cryptographically signed with said private key using a digital signature creator; (g) at the server node, validating said received data, and associating the so-identified Subject with said key pair;

(h) at any one of said network nodes, causing data to be cryptographically signed with said private key using the digital signature creator, said signed data being certifiable to have been signed by said Subject, based on the corresponding public key and the Subject associated therewith.

19. A computer system comprising computer readable code embedded in a non-transitory computer readable medium for carrying out digitally signing data using a cryptographic key in a communication network comprising a server node and at least one further network node, the computer system comprising: (a) generating a cryptographic public key/private key pair using a cryptographic key generator, wherein said key pair is not associated with any Subject's identity; (b) at the server node, storing said public key in a public key store, and (c) storing said private key in a private key store, access to which is granted using a predetermined associated primary authentication factor and at least one yet undefined supplementary, authentication factor; (d) subsequently providing an unidentified user, the Subscriber, with said primary authentication factor, said Subscriber being associated with an identifiable Subject yet unknown to the server node; (e) defining the at least one yet undefined supplementary authentication factor in association with said private key store with data chosen by, and proprietary to, said Subscriber, thereby uniquely associating said private key store and said key pair to the Subject associated with said Subscriber; (f) subsequently receiving, at the server node from at least one network node, data identifying said Subscriber and the associated Subject, said data being cryptographically signed with said private key using a digital signature creator; (g) at the server node, validating said received data, and associating the so-identified Subject with said key pair; (h) at any one of said network nodes, causing data to be cryptographically signed with said private key using the digital signature creator, said signed data being certifiable to have been signed by said Subject, based on the corresponding public key and the Subject associated therewith.

\* \* \* \* \*